J. Old,

Pipe Coupling,

N° 50,619. Patented Oct. 24, 1865.

Witnesses:
Allan C. Bakewell
W. D. Lewis

Inventor:
James Old

UNITED STATES PATENT OFFICE.

JAMES OLD, OF PITTSBURG, PENNSYLVANIA.

PIPE-COUPLING.

Specification forming part of Letters Patent No. 50,619, dated October 24, 1865.

*To all whom it may concern:*

Be it known that I, JAMES OLD, of the city of Pittsburg, in the county of Allegheny and State of Pennsylvania, have invented a new and useful Improvement in Tubular Couplings for Artesian-Well Tubes; and I do hereby declare the following to be a full, clear, and exact description thereof, reference being had to the accompanying drawings, forming part of this specification, in which—

Figure 1:
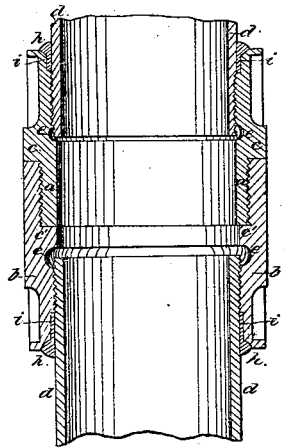
Figure 2:
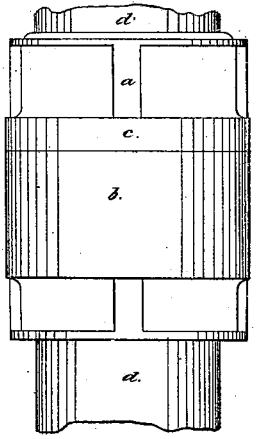
Figure 3:
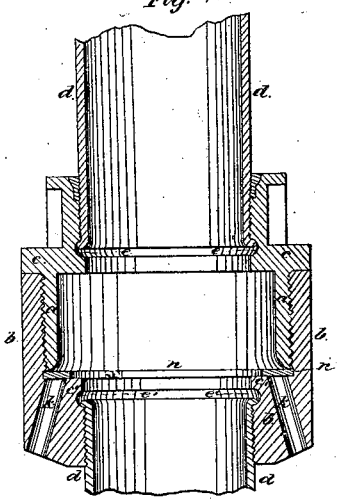
Figure 4:
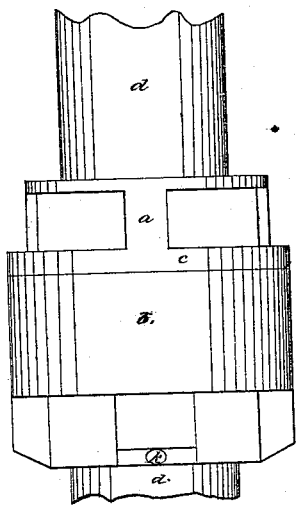
Figure 5:
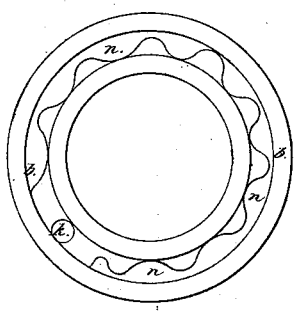
Figure 6:
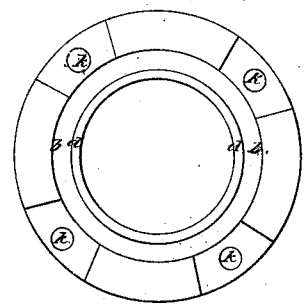

Figure 1 is a longitudinal section through the axis of my improved coupling, showing the mode of attaching it to the tubing. Fig. 2 is an exterior view of the coupling shown in Fig. 1. Fig. 3 is a longitudinal section through the axis of my coupling when made with valves and perforations for the passage of gas, and showing another mode of attaching the coupling to the tubing. Fig. 4 is an exterior view of Fig. 3. Fig. 5 is a top view of the lower section of the valve-coupling, Fig. 3, showing the valves. Fig. 6 is an end view of the lower section of the valve-coupling, showing the perforations for the passage of gas.

In the several figures like letters of reference denote similar parts.

My improvements consist in making a coupling for wrought-iron Artesian tubing of malleable cast-iron, as a new article of manufacture; also, in the mode of attaching and securing the coupling to the thin metallic tubes; also, in the use of valves in the coupling, forming a communication between the exterior and interior of the tubing for the passage of gas in oil-wells.

The tubing now ordinarily used for Artesian wells is made of wrought-iron, about two inches in diameter and only one-eighth of an inch thick, it being important, owing to the great depth of the wells, to make the tubing as light as possible. As these tubes have to be made in sections and united together by couplings, it is necessary to make use of couplings which will have a firm hold on the tubing, and yet be easily screwed and unscrewed. The old method of uniting gas-pipe by means of a ferrule or band having a female screw cut in it, into which the ends of the two pipes were screwed, would not answer for Artesian tubing, because, owing to the thinness of the tubing, it would not admit of a screw being cut in it of sufficient depth to suit the diameter of the pipe, a fine screw on a pipe of two inches diameter having so little pitch as to make it almost impossible to screw the pipes together in the well without stripping the screw.

To remedy this difficulty I invented a coupling made in two pieces, which screwed together, with a sufficiently-coarse thread to prevent the stripping of the screw, and to be easily operated, the sections of coupling being screwed onto the pipe with a fine screw, which would not take so deeply into the surface of the tubing as to weaken it, and being thus attached to the tubing before it is used in the wells.

The coupling which I have just described has always heretofore been made of brass, while the tubing is made of wrought-iron. It is, of course, important that the coupling should be firmly attached to the tubing, and that the axis of the tubing and coupling should be in the same right line, as otherwise the sections, when screwed together, would not form a straight tube, and could not be inserted in the bore of the well, which is always straight. It is difficult, however, to braze the coupling accurately to the tubing when one is made of brass and the other of iron, owing to the unequal expansion of these metals, the brass expanding with heat nearly twice as much as iron.

In order to remedy this difficulty, which, though apparently trifling, is very important in practice, I make the coupling of malleable cast-iron. Thus made, the couplings are stronger, cheaper, and more durable, and they likewise possess the important advantage that the threads are less liable to strip, and they are therefore more easily worked than the brass couplings; and as the contraction and expansion of cast and wrought iron is so nearly the same as to make no practical difference, the coupling may be permanently attached in its proper relative position to the tubing.

In the drawings, Fig. 1, $a$ is the upper section of the coupling, and $b$ the lower section, both of which are made of malleable cast-iron. The upper piece, $a$, has a male screw cut on its outer surface, which extends about halfway up from its lower edge to a shoulder, $c$, which projects outward all around the coupling, and against which the upper edge of the lower section, $b$, presses when the coupling is united. The lower section, $b$, has a female screw cut in its interior surface, extending down from the upper edge to the shoulder $c'$, the distance from the edge of each coupling to the face of its shoulder being the same, so that the edge of each coupling presses against the shoulder of the other, as seen in Fig. 1. The thread of these screws, by which the sections of coupling are united, is so coarse as to give sufficient pitch to the screw to make it easy to screw the parts together.

In the inner surface of the upper section, $a$, above the shoulder $c$, and in the inner surface of the lower section, $b$, below the shoulder $c'$, is cut a female screw with fine threads, so as to screw onto the threads of a fine male screw cut on the outer surface of the extremity of the tubing $d$.

A piece of tubing is screwed into each piece of coupling $a$ and $b$, the extremity of the tubing extending down into the sections of coupling to within a short distance of the commencement of the coarse or coupling screw, to a point where there is cut a groove, $e$, in the inside of the coupling. In the upper section, $a$, of the coupling the groove $e$ occurs at or near the level of the top of the shoulder $c$, and in the lower coupling the groove $e'$ occurs just below the shoulder $c'$. The object of these grooves is to force out the end of the tubing by means of a conical wedge, so as to cause it to turn into the groove, as shown in Fig. 3, and by this means the tubing is securely fastened in its coupling, it being impossible for it to become unscrewed when the end of the tubing is thus enlarged.

Another mode of securing the sections of coupling on the tubing is shown in Fig. 1. Around the upper edge of the upper section of coupling, $a$, and around the lower edge of the lower coupling, $b$, is a gutter or depression, $h$, tending downward toward the axis of the coupling, and for the depth of about one-fourth of an inch from the inner edge of the coupling the inner surface of the coupling is cut down to about the depth of the screw-threads, forming a channel, $i$, all around the tubing between it and the coupling. This channel $i$ and gutter $h$ are filled with solder, melted and run in after the coupling is screwed onto the end of the tubing. The effect of this is fasten the coupling securely onto the end of the tubing above the screw and to strengthen the tubing.

The two modes of fastening the sections of coupling to the tubing after they are screwed together (shown in Figs. 1 and 3) are either of them sufficient without the other; but the coupling is so made that either or both may be practiced as may be desired.

In oil-wells a great deal of trouble is frequently experienced from the presence of gas, which accumulates below the seed-bag which surrounds the tubing of the well and forces its way into the pump-chamber, oftentimes preventing the working of the pump, and at other times hindering the flow of oil into the well. This gas is sometimes got rid of by inserting a gas-pipe through the seed-bag, so as to allow the gas to escape. If, however, this gas is allowed to enter the tubing of the well above the upper valve of the pump, it will not only escape without doing any injury, but will aid in lifting the column of oil and water in the tubing above the pump-chamber, and thus perform very efficient service. In order to enable the gas thus to enter the tubing above the pump-valves, I use at any convenient point in the tubing between the seed-bag and pump-chamber a coupling constructed as shown in Figs. 3 and 4. This valve-coupling is similarly constructed to that shown in Figs. 1 and 2, excepting in the following particulars: Between the shoulder $c$ in the upper section of the coupling and the collar $c'$ in the lower section the diameter of the coupling is enlarged, the face of the shoulder $c'$ in the lower coupling being much broader, so as to give width enough for the tubular passages $k\ k$, of which there may be four (more or less) in the lower coupling, at uniform distances apart. These passages extend downward and outward, so as to open at the outside of the lower coupling. A ring of leather, $n$, is fitted into the lower coupling at the base of the screw, so as to lie on the top of the ledge formed by the shoulder $c'$, and so as to cover the openings made by the passages $k\ k$, the leather being scalloped between the holes $k\ k$, as seen in Fig. 5, so as to allow the leather valves $n$ to rise when the gas is passing upward and close when the gas ceases to flow.

The leather valve-ring $n$ may be fastened down by wooden pegs inserted into fine holes in the shoulder $c'$, and is further kept in place by the lower edge of the upper coupling, which is screwed down against it. One such valve-coupling will suffice in a well, and may be used where it is not known that there is gas in the well, as it will be at all times ready to operate if gas should appear, and can in no way interfere with the operation of pumping, whether there is gas or not.

In case there should be a pressure of gas in the well and the oil should rise, as it sometimes does, above the working-barrel of the pump outside of the tubing, the gas will force the oil through the valves in the coupling into the tubing, and thus cause the well to flow without the aid of the pump.

What I claim as my invention, and desire to secure by Letters Patent, is—

1. Connecting a thin metal pipe to a section of screw-coupling by screwing the former into the latter and otherwise securing them, as hereinbefore described.

2. Making the coupling for tubing of wells with a valve or valves, constructed and arranged substantially as described, for the passage of gas or oil from the exterior to the interior of the tubing.

In testimony whereof I, the said JAMES OLD, have hereunto set my hand.

JAMES OLD.

Witnesses:
A. S. NICHOLSON,
W. BAKEWELL.